United States Patent [19]

Coakley et al.

[11] Patent Number: 5,576,691

[45] Date of Patent: Nov. 19, 1996

[54] METHOD AND APPARATUS FOR DETERRING THEFT OF MANUALLY OPERATED WHEELED VEHICLES

[75] Inventors: George Coakley, Los Gatos; Alexander Pummer, Pleasanton; Matthew Homer, San Jose; James P. Johnson, Antioch; Joseph Fanelli, Danville, all of Calif.

[73] Assignee: Polytracker, Inc., San Jose, Calif.

[21] Appl. No.: 372,486

[22] Filed: Jan. 12, 1995

[51] Int. Cl.[6] .................................................. G08B 13/14
[52] U.S. Cl. ...................... 340/568; 188/111; 280/33.994
[58] Field of Search .................................. 340/568, 539, 340/571; 280/33.994; 188/111, 162, 158; 180/167; 307/10.2; 70/226, 228; 455/345

[56] References Cited

U.S. PATENT DOCUMENTS

| | | | |
|---|---|---|---|
| 2,964,140 | 12/1960 | Berezny | 188/111 |
| 3,002,370 | 10/1961 | LaBrie, Jr. | 188/111 X |
| 3,590,962 | 7/1971 | Parker et al. | 188/111 |
| 3,652,103 | 3/1972 | Higgs | 280/33.994 |
| 4,242,668 | 12/1980 | Herzog | 340/539 |
| 4,772,880 | 9/1988 | Goldstein et al. | 340/571 |
| 5,283,550 | 2/1994 | MacIntyre | 340/571 X |
| 5,432,412 | 7/1995 | Harris et al. | 280/33.994 X |

*Primary Examiner*—Thomas Mullen
*Attorney, Agent, or Firm*—Claude A. S. Hamrick

[57] ABSTRACT

Method and apparatus for deterring theft of manually operated wheeled vehicles, reducing unauthorized use and removal of steel or steel and plastic constructed swivel-wheel shopping carts by preventing the free movement of one or more of the installed wheels. Attached to the frame of the shopping cart, a braking device in accordance with the present invention, when activated, measures the distance traveled beyond an activating point by counting the number of wheel rotations made by the cart and compares this to a preprogrammed stored attribute that defines the allowable distance the cart is allowed to travel once outside the shopping facility. Depending on the direction the cart is travelling, the counter is "armed" or "disarmed" when the cart passes over low-frequency magnetic arrays placed at the entry or exit of the shopping facility.

17 Claims, 6 Drawing Sheets

METHOD AND APPARATUS FOR DETERRING THEFT OF MANUALLY OPERATED WHEELED VEHICLES

BACKGROUND OF THE INVENTION

1. Field of the Invention

This invention relates generally to anti-theft devices for manually powered swivel-wheel shopping carts, and particularly to an apparatus for use in controlling or inhibiting the unauthorized use and removal of these swivel-wheel shopping carts from a specified or designated area. The invention specifically relates to a method and apparatus for sensing and measuring the distance a swivel-wheel shopping cart travels after a triggering event has occurred. Should the cart move beyond its preprogrammed authorized distance, a braking mechanism is engaged to inhibit the free rotation of one or more of the cart's wheels, thereby interfering with further movement of the cart.

2. Brief Description of the Prior Art

Presently, there are thousands of grocery stores, shopping plazas, hardware and gardening centers that provide their customers with the convenience of having a shopping cart available to transport goods to and from their premises. Once the customer is finished with the cart, it is typically returned to a designated area or simply abandoned in the store's parking lot. Due to the number of shopping carts used during the course of a business day by one of these stores or supermarkets, it is difficult to account for each and every cart used. Shopping carts are often stolen or borrowed for some otherwise innocent purpose. However, regardless of the purpose for removal, once a cart is removed from a store's premises, it is almost never returned.

The cart owners are justifiably concerned about the unauthorized use and theft of their shopping carts since the average shopping cart costs approximately $120.00. Due to the expense, as well as the frequency of theft, lucrative businesses have been created specializing in shopping cart recovery. However, industry statistics have shown that these firms are only able to recover approximately thirty percent of all the carts stolen or removed during the course of a calendar year. This means that out of a million carts stolen each year there are over 600,000 carts that are never recovered. By adding costs associated with both replacement and recovery to the day-to-day operations of these business, an anti-theft system that tends to prevent a shopping cart from ever leaving a store's premises will save the retail industry in excess of $60 million per year.

Previous methods have been devised in an attempt to prevent shopping carts from being removed or stolen. One such system includes installation of physical barriers along the perimeter of a parking area to prevent the user from pushing the cart into the parking area. However, such barriers are impractical since it is desirable to allow a customer to take the cart to his car for the loading or unloading of his goods. Other anti-theft devices or systems designed for shopping carts are configured with some type of wheel-locking mechanism that is triggered by either a timer, or by a magnetic field with a fixed frequency, when the shopping cart passes through it. Most of these anti-theft systems require extensive modifications to the shopping cart and the wheel so that the locking mechanism works properly. An example of this type of system is disclosed in U.S. Pat. No. 2,964,140 granted December 1960 to M. N. Berezny. This anti-theft system employs an electromagnetically actuated, pin-directed braking mechanism which can be installed in place of one or more of the cart's wheels. Upon activation, the system forces a horizontally positioned pin into an aperture in the wheel, preventing the wheel from turning or moving any farther. The disclosed device incorporates a fixed magnetic field as a means of activating the brake mechanism at an appropriate time. When the cart passes over a cable that has been either embedded in the concrete about the perimeter of the parking lot to generate a magnetic field, or has been placed in front of the exit of the store, a sensor activates and closes a switch in the control logic of the locking mechanism that, in turn, forces the pin into an available opening in the wheel, impeding its rotation.

Anti-theft devices like the one described above have had a number of problems. Firstly, the devices require that a magnetic cable be installed around the perimeter of the parking lot, or if the magnetic cable is used at the exits of the parking lot, then the lot must be fenced. In any event, neither of these approaches are cost-effective or practical. Secondly, the brake mechanism of the Berezny system is exposed and susceptible to being damaged by a person bent on stealing the cart. Thirdly, this approach requires that the sensory and the braking elements of the system be calibrated and balanced several times a month to operate effectively. If the system is not calibrated or maintained properly, the locking mechanism will not respond properly, thus locking the wheel prematurely.

Another approach is disclosed in U.S. Pat. No. 4,242,668 granted December 1980 to W. Herzog. This apparatus mounts to the front of a cart and uses a latched brake or blocking mechanism which falls down in front of the cart, stopping its forward progress. Like Berezny's system, the latched brake mechanism is activated by a sensor installed on the cart's undercarriage. The sensor detects when the cart has crossed over a magnetic strip placed at an exit of the parking lot. Once again, the principal disadvantage of this anti-theft system lies in the prohibitive expense and complex modification required to install this type of system to the undercarriage of an existing cart. Again, like Berezny, Herzoq leaves the locking device, or mechanism, open to vandalism and damage by a would-be thief.

Still another approach can be found in U.S. Pat. No. 3,652,103, granted in March 1972 to S. P. Higgs. Unlike the other systems described above, this system incorporates a timer to activate a braking mechanism. With this type of system, when the cart leaves the shopping facility, the timer is activated and after a predetermined period of time, the brake mechanism engages, interfering with further movement of the cart. Here, the time period is determined by how much time a customer requires to reach the farthest point of the parking lot plus some contingency for a momentary stop or delay. With this approach, when the timer approaches its limit, it slowly engages the brake making the cart more and more difficult to move. Thus, if a customer is parked at the farthest point in the parking lot, and the braking mechanism engages prematurely, making the cart difficult to push, a great deal of customer annoyance and dissatisfaction results. Furthermore, the expense required to install and maintain an anti-theft system of this type will have a significant impact on the overhead costs associated with a typical retail operation.

Further still, another and somewhat more practical solution is disclosed in U.S. Pat. No. 4,772,880 granted September 1988 to L. W. Goldstein et al. This patent discloses a clamp-on, battery-powered receiver and sensor system that detects when a cart is about to be removed and activates a bolt-on locking mechanism to prevent the cart from leaving a parking lot or prescribed use area. Although easily installed, this type of device is subject to vandalism and removal, thus allowing the cart to be damaged or easily stolen. Like the other systems defined above, this system requires that a set of transmitters be installed around the perimeter of the parking lot and adds substantially to the start-up and maintenance costs to support such a system.

As illustrated by the numerous thefts that occur each and every day, these systems have failed to prevent or even substantially reduce the unauthorized removal of such carts. In addition, these systems tend to be difficult to install and maintain, requiring special equipment and tools to keep the cart in operational condition. More importantly, most of these systems require that expensive components be added to each shopping cart, not to mention the expense required for the equipment that must be installed around the perimeter, or at the exits of a parking lot, in order to operate the system effectively.

Thus, there still exists a substantial need to provide a cart theft deterrent system that is cost-effective to produce, install and maintain.

SUMMARY OF THE INVENTION

The present invention provides a method and apparatus that significantly reduces unauthorized use and removal of steel or steel and plastic constructed swivel-wheel shopping carts by preventing the free movement of one or more of the installed wheels. Attached to the frame of the shopping cart, a braking device in accordance with the present invention, when activated, measures the distance traveled beyond an activating point by counting the number of wheel rotations made by the cart and compares this to a preprogrammed stored attribute that defines the allowable distance the cart is allowed to travel once outside the shopping facility. Depending on the direction the cart is travelling, the counter is "armed" or "disarmed" when the cart passes over low-frequency magnetic arrays placed at the entry or exit of the shopping facility.

An advantage of the present invention is that it is passive and unobtrusive. This means that when the shopping cart is within the confines of the market, store or shopping facility, it is free to move about as the customer sees fit. Once the cart exits the shopping facility, the counter is activated and starts a predetermined countdown of wheel rotations before the brake is engaged to stop the shopping cart. The cart remains at the point of engagement until it is retrieved by a store employee or a designated retrieval service.

Another advantage of the present invention is that the braking and sensor assembly can be readily and conveniently installed on existing swivel-wheel shopping carts.

A further advantage of the present invention is its simple construction and reasonable cost of manufacture.

Yet another advantage of the present invention is that both the sensor/counter, as well as the braking elements, are of durable design with minimum maintenance requirements.

Still another advantage of the present invention is that when the braking mechanism has been engaged, it can readily be deactivated and restored to its normal state or position by an authorized store employee.

These and other objects and advantages of the present invention will no doubt become apparent to those skilled in the art after having read the following detailed description of the preferred embodiment which is illustrated in the several figures of the drawing.

IN THE DRAWING

DETAILED DESCRIPTION OF THE PREFERRED EMBODIMENT

Figure 1:
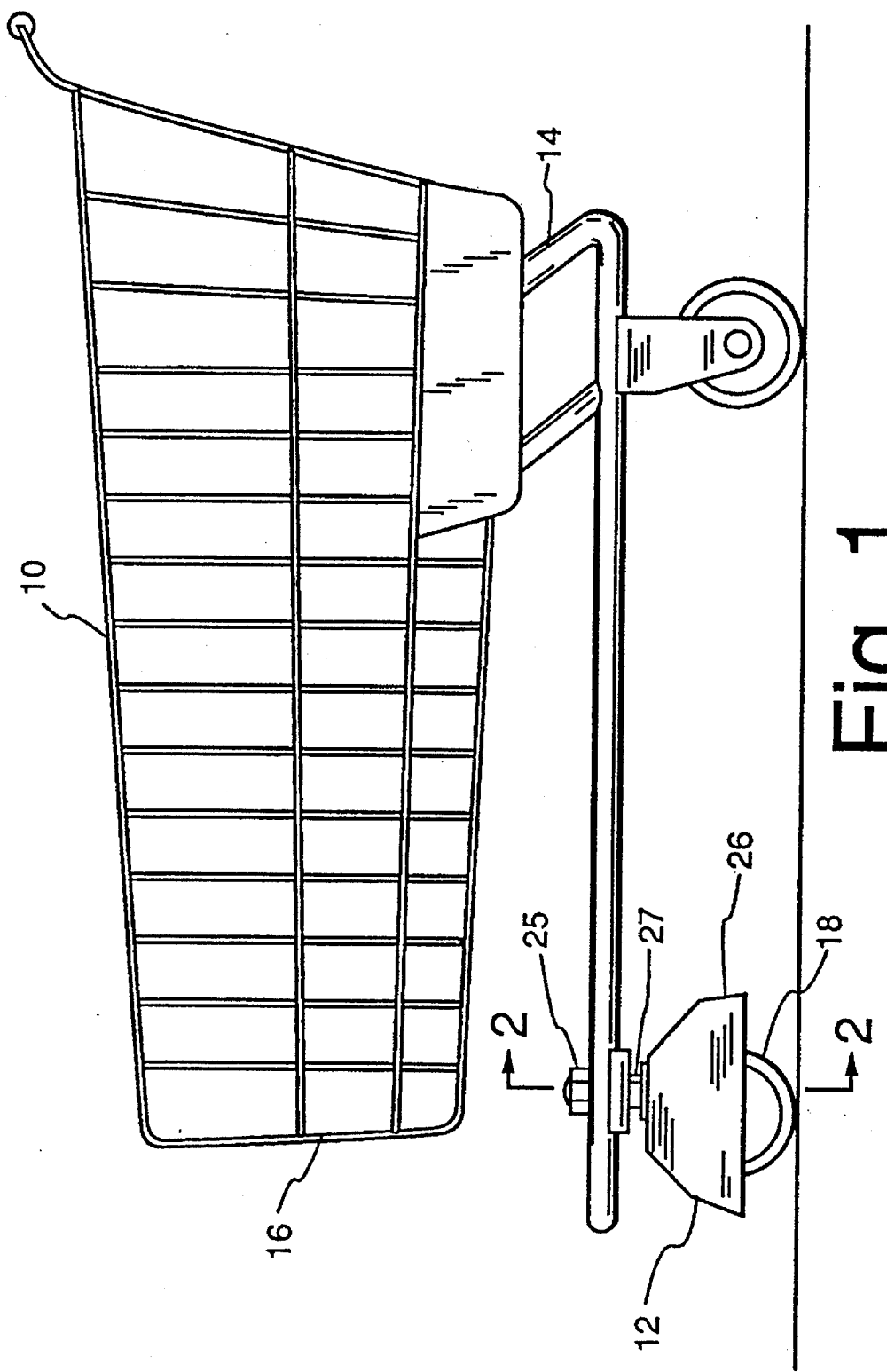
FIG. 1 shows a conventional shopping cart which has been fitted with anti-theft apparatus in accordance with a preferred embodiment of the present invention.

FIG. 1 shows a conventional shopping cart 10 which has been fitted with a cart-mounted unit 12 forming a part of the anti-theft system that constitutes a preferred embodiment of the present invention. Typically, shopping carts like the one shown in this diagram are constructed with a tubular metal frame 14 on which is mounted the wire or plastic basket 16 that supports a handle mounted in the usual fashion. Two pairs of wheels are attached to the lower portion of the frame 14, and the two wheels in the front are pivotally mounted to the frame 14 to swivel about vertical axes while the rear wheels 22 and 24 are fixed to the frame 14 and rotate about fixed axles.

As shown, the cart-mounted unit of the preferred embodiment is comprised of an assembly that includes a wheel 18 that replaces one of the cart's original front wheels. Unlike other approaches, the cart-mounted unit 12 is a fully self-contained assembly. That is, the wheel 18 and all of the operative components used to automatically stop the cart's forward progress are housed in a protective enclosure 26.

Initially, when the system is disarmed, the cart 10 is able to travel freely such that each wheel can rotate and the cart can move without restriction. Depending on the store's specific requirements or application, the unit 12 can be easily installed in place of either a front or a back wheel of the cart. However, as indicated, a front wheel configuration is preferred because the retrofitting operation can be performed by removal of a single nut, i.e., the nut 25 used to secure the pivot shaft 27 of the swivel-wheel mount to the cart frame. When installed, as indicated, at the left front wheel position, for example, and when the braking mechanism contained within unit 12 is engaged (as will be explained below), the cart will come to an abrupt stop making the cart difficult to move in any direction. As will also be explained below, the setting and resetting of the unit is normally automatic and requires no attention unless the cart is misused. And even in the event of misuse, the unit can be easily reset by an authorized employee.

Figure 2:
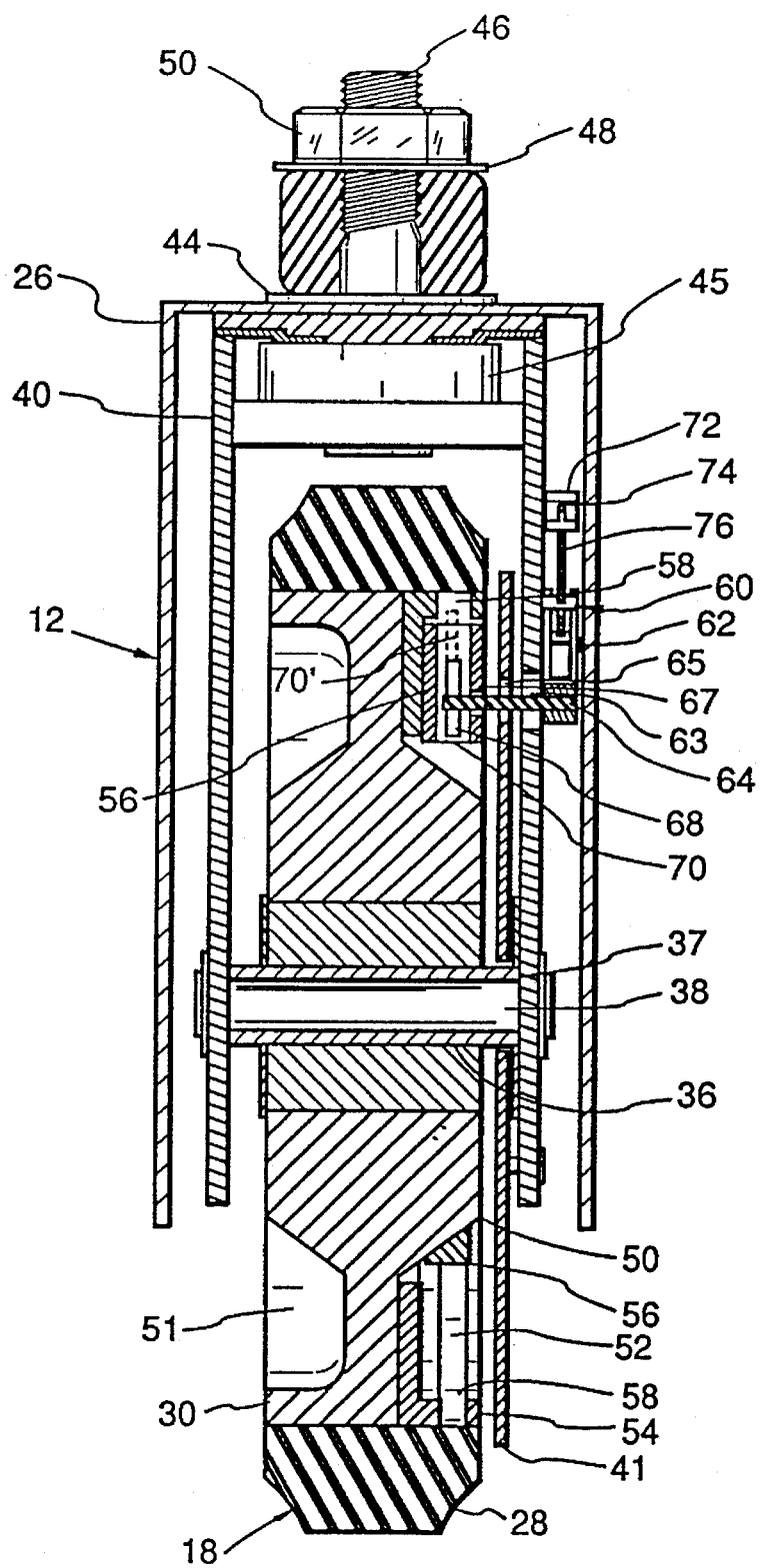
FIG. 2 is a cross-section taken along the line 2—2 of FIG. 1 of the brake assembly of the cart theft deterrent system.

Referring now to FIG. 2 wherein the principal functional components of the preferred embodiment of the cart-mounted unit are depicted, it will be noted that the wheel 18 is comprised of a rim 28 molded from hardened rubber or rubber-like material which has been placed about the circumference of a metal or plastic wheel hub 30. The hub 30 includes a sleeve bearing 36 that allows the wheel 18 to easily rotate about its axis on a tubular shaft bearing 37 through which an axle bolt 38 extends to secure the wheel to a component support frame assembly and yoke 40. In addition to holding the wheel 18 in position, the yoke 40 is designed to serve as the mounting facility for all of the functional components of the unit. Covering yoke 40 and the other elements of the preferred embodiment of the present invention is the protective enclosure 26. Supported by the yoke 40, the enclosure 26 is secured in place by a washer 44 when the unit 12 is installed in position by means of a swivel assembly 45 including a threaded swivel shaft 46 which extends through an opening 47 in frame 14 and is secured thereto with a nut 50 and lock washer 48.

As illustrated, annular recesses 51 and 52 have been formed in opposite faces of the wheel hub 30. The recess 52 in face 50 of the wheel hub 30 is configured to accommodate both the brake plate 54 and a horseshoe-shaped flange 56 affixed to yoke 40 and cover plate 41 and described below with reference to FIG. 4. The brake plate 54 is a ring, having an L-shaped cross-section, that fits securely in recess 52 and is fastened to hub 30 by suitable fasteners (not shown). The dimensions of the brake plate 54 are slightly smaller than those of its host thus, providing a snug fit which in turn, prevents any relative movement when the locking mechanism is engaged. The brake plate 54 has two strategically placed radially extending apertures 58 that are 180° apart to receive a locking pin when the braking or locking mechanism is engaged. The physical dimensions of the apertures 58 are selected as appropriate for receiving the locking pin.

Mounted to the outside face of yoke 40 is an actuating arm and lock assembly shown generally at 60. The assembly 60 includes an actuator arm 61 pivotally secured to yoke 40 by a pivot pin 62. Attached to arm 61 is a horizontally extending connecting rod 64 that extends through a set of apertures 63, 65 and 67 in the yoke 40, a cover plate 41, and the flange 56, respectively. The distal end of rod 64 is affixed to the lower end of a locking pin 68 disposed in a vertically extending bore 70 formed in flange 56. As described below, as the arm 61 is rotated about pin 62, its lower end will rise, and through connecting rod 64 raise pin 68 as indicated by the dashed lines 70' into locking engagement with one of the apertures 58. As will also be described in more detail below, the arm 61 is operatively connected by an actuator spring 76 to a lead screw following collar 72 threadably engaged to a lead screw 74.

Figure 3:
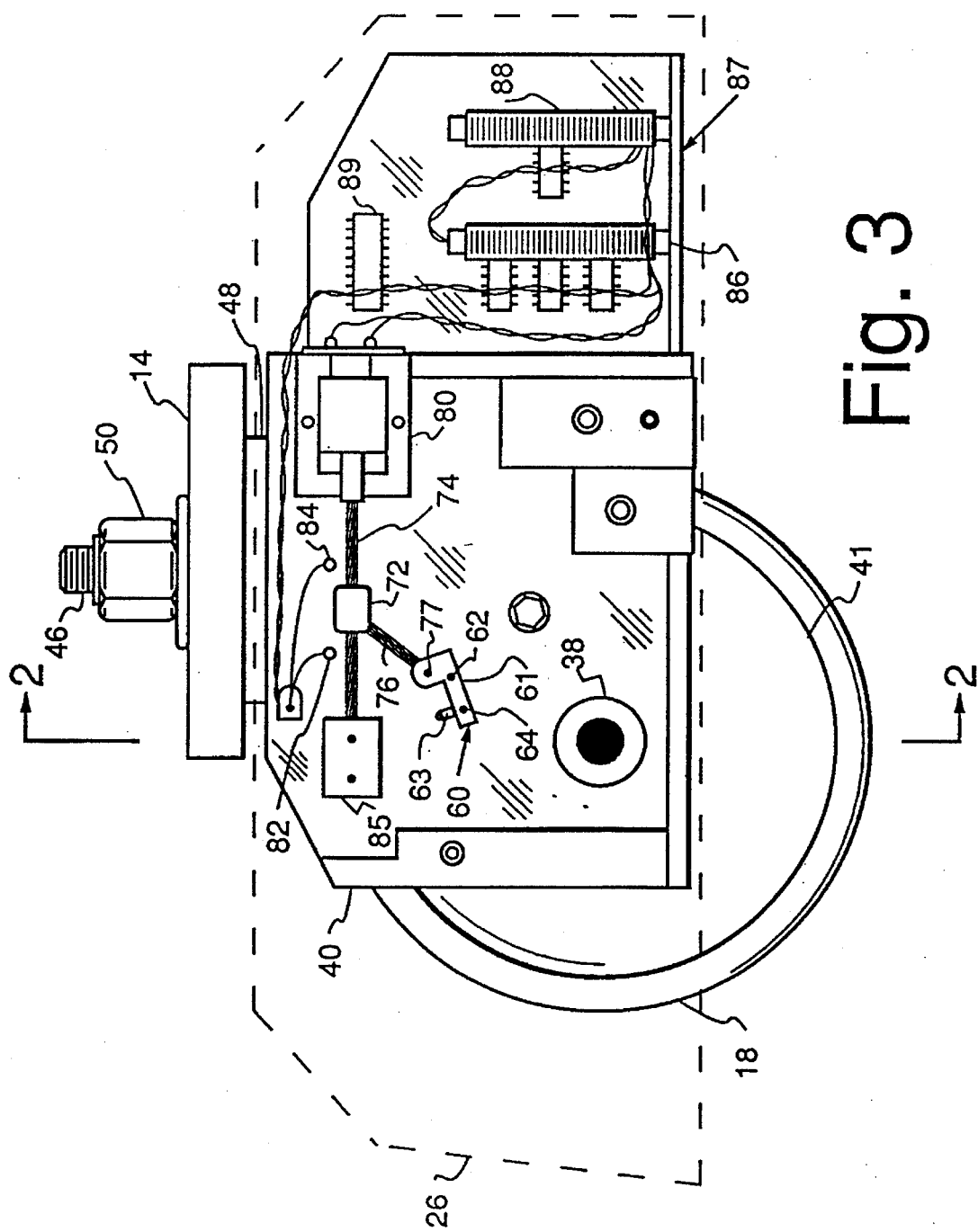
FIG. 3 is a side view depicting essential elements of the brake assembly illustrated in FIG. 2.

FIG. 3 is a side view of the unit with cover 26 (shown in dashed lines) removed. Shown in this figure are the external components of the brake assembly including a bi-directional motor 80 that drives the threaded lead screw 74 that is terminated at its distal end by a bearing block 85 affixed to yoke 40. Positioned about the lead screw 74 is the screw-following collar 72 that travels up or down the shaft 74, depending on the direction the lead screw is turned by the motor 80. As previously mentioned, the actuator spring 76 is attached to the underside of the collar 72 and extends downwardly with its lower end being attached to the actuator arm 61 by means of a small connector pin 77. Strategically placed above the lead screw 74 are two limit switches 82 and 84 that determine the travel limits of the collar 72. As the collar 72 engages either of the switches 82 or 84, the power to the motor 80 is terminated, stopping the collar 72 in position. The first switch is the reset switch 84 and has been placed directly in front of the motor 110 to prevent the collar 72 from being driven into and damaging the motor 80. The other switch is placed near the other end of the shaft 82 to prevent the collar 72 from hitting the bearing block 85.

When power is applied to the motor 80, the lead screw 74 is turned in a direction causing the collar 72 to move forward, tending to compress the spring 76 to apply a force causing arm 61 to rotate counter-clockwise about pin 62 and into the unlatched position indicated. On the other hand, when motor 74 rotates lead screw 80 in the opposite direction, causing collar 72 to move rearwardly to the right as depicted, the collar applies a tensile force to spring 76, which in turn causes arm 61 to rotate in the clockwise direction lifting connecting rod 64 in slot 63 and raising pin 68 (FIG. 2). As the locking pin 68 moves upward along the bore 70 (FIG. 2) of the horseshoe-shaped flange 56, it will extend into one of the apertures 58 of the brake plate 54, thus stopping the rotation of the wheel 18.

To reset the locking mechanism, a command signal is sent changing the polarity of the motor 80. The motor 80 then turns the lead screw 74 to send the collar 72 in the reverse direction. As collar 72 moves back along the lead screw 74, it causes spring 76 to apply a force to the actuator arm 61 causing it to rotate counterclockwise, pulling the locking pin from engagement with the brake plate 54. When the locking pin 68 has been fully retracted and the actuator arm 61 has been set back to its original position, the system is considered disarmed, and the wheel can again move freely.

Shown affixed to the right side of yoke 40 at 87 is an electronics compartment containing the various electronic components required to operate the unit 12. Included among such components are a pair of electromagnetic field sensing antenna coils 86 and 88, various electronic devices 89, and a wheel rotation sensor 92.

Figure 4:
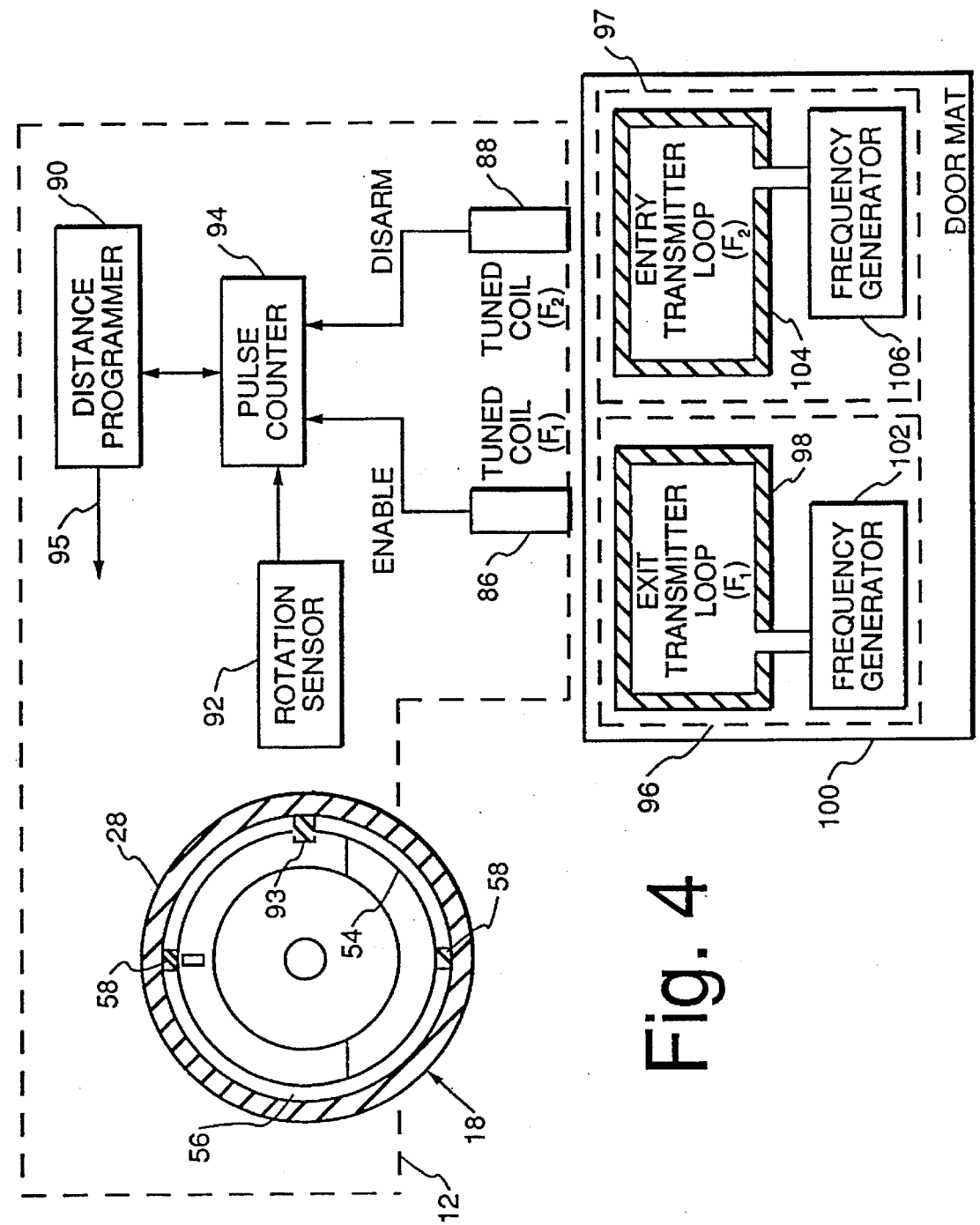
FIG. 4 is a block diagram illustrating the principal operative components that control the essential functions of the preferred embodiment.

Reference is now made to FIG. 4 illustrating the principal operative components of a distance program module 90, a wheel rotation sensor 92, a pulse counter 94, and a pair of tuned coils 86 and 88 that serve as the electromagnetic-field-detecting sensors or antennae. Each time the wheel rotates, a small magnet 93 carried by the wheel excites the rotation sensor 92 causing it to generate an electrical pulse that is accumulated and stored by the pulse counter 94. Should the accumulated count be determined to equal a predetermined count stored in the distance programmer 90, a signal will be generated at 95 causing motor 80 to activate the locking mechanism to stop the cart's progress. The allowable cart travel distance is defined by the number of wheel rotations, and is normally pre-set at the time of installation.

In order to automatically set and reset a cart-carried unit 12, a pair of electromagnetic field transmitters 96 and 97 are provided and suitably positioned at appropriate locations relative to a given facility at which carts are provided. Passage in one direction through the localized electromagnetic fields generated by the transmitter sets the unit while passage through the fields in the opposite direction resets the unit. In the preferred embodiment, the two transmitters, or at least the field-generating loops thereof, are incorporated into a mat 100 over which the cart passes in exiting and entering the facility. Loop 98 is driven at a frequency $F_1$ by a signal generator 102, while loop 104 is driven at a different frequency $F_2$ by a signal generator 106.

The two coils 86 and 88 are respectively tuned to the frequencies $F_1$ and $F_2$. As the exiting cart travels through the fields generated by exit transmitter loops 98 and 104, the coils 86 and 88 will resonate at their tuned frequencies. If the cart has last passed through field $F_1$, it will in effect sense that it is exiting the facility and the counter 94 will be started to allow the cart to travel only the prescribed distance before the brake is activated. On the other hand, if the cart passes last through field $F_2$, the unit will sense that it is entering the facility, and the counter and brake mechanism will be reset, allowing the cart to move freely about the store or retail facility.

Figure 5:
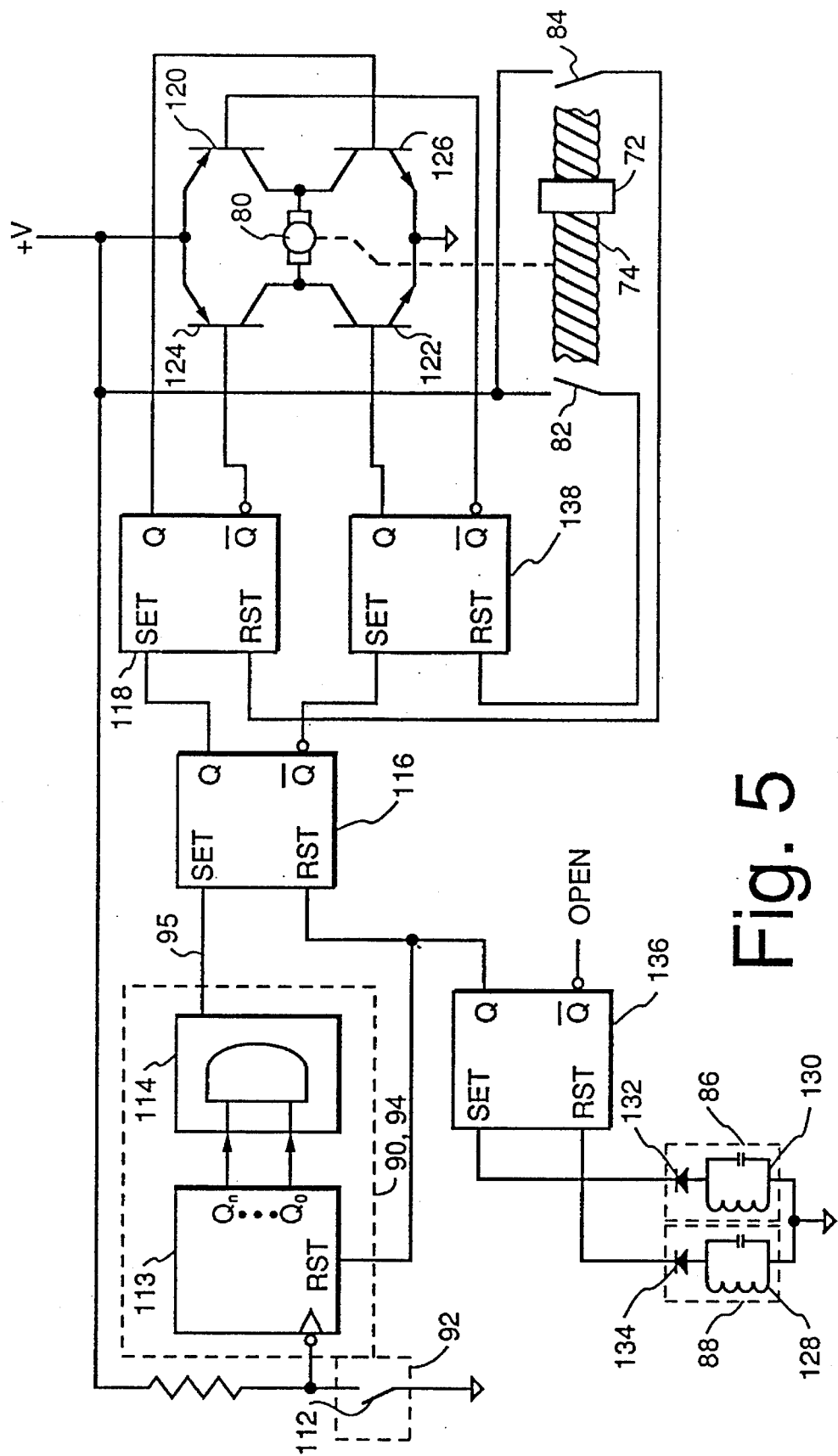
FIG. 5 is a circuit diagram showing in more detail the cart electronics shown in FIG. 4.

FIG. 5 schematically depicts a circuit diagram of the cart electronics used to manage and control the braking unit. As depicted in FIG. 4, the rotation sensor 92 is mounted on the component frame and yoke 40 in close proximity to the wheel 18. In the preferred embodiment, the sensor is comprised of a reed switch 112. Each time the magnet 93 passes the reed switch 112, it causes the normally open reed switch 112 to close and generate a pulse that increments the pulse counter 94. In the illustrated preferred embodiment, the pulse counter 94 and distance programmer 90, shown in FIG. 4, are implemented by the combination of a 14-bit binary counter 113 and a programmable AND gate 114. The outputs of counter 113 are input to the programmable AND gate 114 which in effect detects when the programmed count has been reached and generates an output at 95 which is coupled into the SET input of a set/reset latch 116. The Q output of latch 116 is connected to the SET input of a set/reset latch 118, the Q and Q outputs of which control a pair of transistors 124 and 126 that, when turned on, cause the motor 80 to turn the threaded shaft 74 to move the collar 72 in the direction of limit switch 84. The motor 80 will continue to turn shaft 74 until the collar 72 engages and closes the limit switch 84. Closure of switch 84 couples V+ to the reset input RST of latch 118, causing it to reset and turn OFF transistors 124 and 126, whereby motor 80 stops turning the shaft The Q output of latch 116 is connected to the set input SET of a third set/reset latch 138, the outputs of which control a pair of transistors 120 and 122 that, when turned ON, cause motor 80 to be energized in the opposite direction, driving collar 72 toward limit switch 82. The reset input RST of latch 116 is connected to the Q output of a fourth set/reset latch 136, the RST input of which is coupled to the output of the exit field sensing coil 86, and the SET input of which is coupled to the entrance sensing coil 88. Note that the Q output of latch 136 is also connected to the RST input of counter 113 so as to start the counter each time the cart exits the facility.

To move the collar 72 back to its reset position releasing the braking mechanism and freeing the wheel 18, transistors 120 and 122 must be activated to change the motor's polarity and turn the shaft 74 in the opposite direction to move collar 72 leftwardly (as depicted in FIG. 5). When the collar engages and closes the other switch 82, the motor 80 will again be turned OFF by the application of V+ to the RST inputs of latch 138, causing it to reset. As the collar 72 moves in the direction indicated, it applies, via spring 76 (FIG. 3), a force to actuator 61, causing it to rotate counterclockwise, causing locking pin 68 to mechanically disengage from the brake plate 54 (FIG. 2).

As previously mentioned, the two tuned coils 86, 88 are used to arm and disarm the system. The coils are actually configured as tank circuits 128 and 130 that in the presence of alternating electromagnetic fields (alternating at the tuned frequencies $F_1$ and $F_2$, respectively) resonate and generate AC signals which are rectified by diodes 134 and 132, respectively, to provide inputs to the RESET and SET inputs of latch 136.

Specifically, as the tank circuit 128 passes in close proximity to the exit transmitter 96, which is emitting a field of frequency of $F_1$, an AC voltage is induced in the tank circuit 128. This voltage is then converted to a pulsating DC current by diode 134 which resets the Set/Reset latch 136. The Q output of latch 136 sets both latch 116 and counter 113, and the counter 113 thereby commences to record the number of wheel rotations, thus making it possible for the locking mechanism to activate if the cart should be taken beyond the prescribed distance.

Similarly, when the cart is returned to the store, and tank circuit 130 passes in close proximity to the entry transmitter loop 104, which is emitting a field of frequency $F_2$, an AC voltage is induced in the tank circuit 130. This voltage is converted to a pulsating DC current by diode 132 which places latch 136 in the set mode. The Q output thereof forces the counter 113 into its reset mode, thus preventing it from counting. In addition, if latch 116 has been set, it will be reset, forcing latch 138 to set and excite transistors 120 and 122, changing the motor's polarity and turning the shaft 74 in a direction which drives the collar 72 back toward switch 82 forcing the brake into it disengaged mode. The cart can now be pushed an unlimited distance without engagement of the brake.

Figure 6:
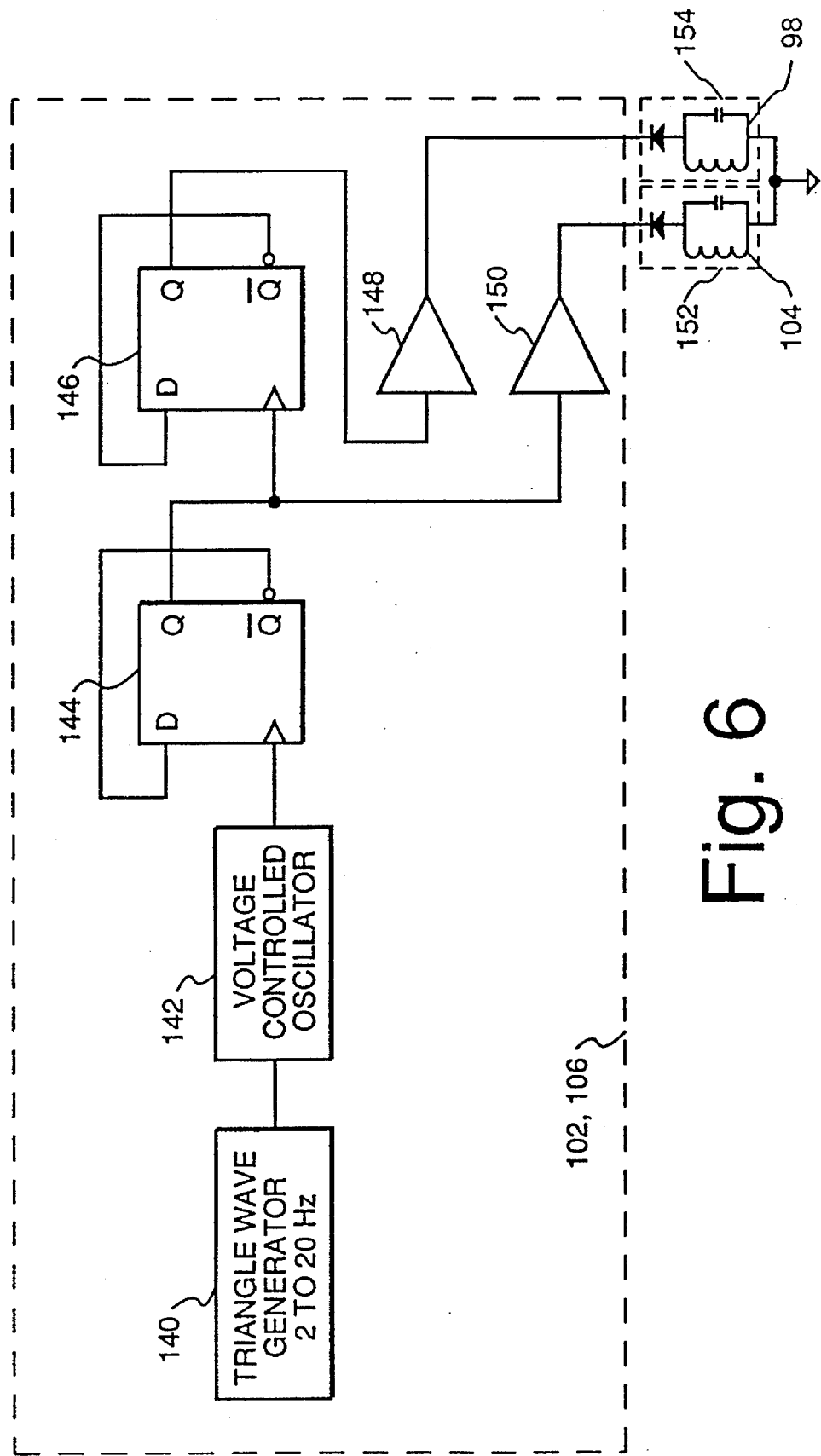
FIG. 6 is a block diagram showing in more detail the transmitter electronics used to activate or disarm the cart-mounted components of the preferred embodiment.

FIG. 6 depicts a block diagram of the transmitter electronics associated with mat 100 (FIG. 4) and used to either activate or disarm the system as the cart passes over it. Embedded in a rubberized door mat 100, the frequency generators 102 and 106 (FIG. 4) are combined in a single circuit comprised of a simple triangle wave generator 140 whose output signal controls an oscillator 142. Connected to the oscillator 142 is a D flip-flop 144 that is configured as a divide-by-2 logic gate, the purpose of which is to produce a signal with a fifty percent (50%) duty cycle. This type of duty cycle generates a square wave signal without second harmonic content of the fundamental frequency of the square wave. This signal is used to drive a high current buffer 150 which in turn drives a tank circuit 152 including entry transmitter loop 104 to generate the entry field at frequency $F_2$. Similarly, another flip-flop 146, configured as a divide-by-2, drives a second high current buffer 148 which in turn drives a tank circuit 154 including the loop 98, used to produce the exit field operating at frequency $F_2$.

The purpose of the triangle wave generator 140 is to sweep the oscillator 142 over a fairly narrow range of frequencies to which the cart tank circuits may be tuned. By allowing the frequency to vary slightly from a known median frequency over some narrow range, a resonance match is always guaranteed when the oscillator 142 sweeps through those frequencies. This process alleviates the need to balance or calibrate the tank circuits in each cart, thus reducing if not eliminating the considerable expense required to maintain precise calibration in each and every cart brake mechanism.

The transmit power required for the entry and exit transmitters is very low due to the fact that the tank circuits have a high Q and the cart sensors are brought into close proximity to the mat 100. Furthermore, the frequencies used are in the 10 to 50 kHz range. Since the coils radiate predominantly magnetic energy at low power, there is no need to obtain FCC licensing.

The anti-theft apparatus described effectively discourages removal of shopping carts from parking lots. If a user tries to push a cart beyond the prescribed distance, the locking mechanism will activate and make it different to push the cart. This provides an effective deterrent to the unauthorized removal of these carts, particularly in cases where a user merely wants to use a cart to transport goods to his/her home (the major cause of shopping cart loss).

The design of the apparatus prevents easy manual tampering with the brake assembly, since all moving parts are within the protective housing. The apparatus is relatively inexpensive to manufacture and install, and will not interfere with normal use of the shopping cart.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. An anti-theft apparatus for inhibiting the unauthorized use and removal of a shopping cart from a designated use area, comprising:

a wheel;

a rotation-inhibiting means in association with said wheel, said rotation-inhibiting means including a rigid locking member movable between an unlocked position and a locked position in which it immobilizes said wheel against movement;

a counting means;

means for detecting passages of said shopping cart past a predetermined reference point and operative to set and reset said counting means, said predetermined reference point being identified by means generating a first magnetic field oscillating at a first frequency and a second magnetic field oscillating at a second frequency, said detecting means including a first tuned coil responsive to said first magnetic field and operative to set said counting means, and a second tuned coil responsive to said second frequency and operative to reset said counting means;

a sensor means for sensing rotation of said wheel and for generating an output which can be counted by said counting means; and a means activated by said counting means and operative to actuate said rotation-inhibiting means after a predetermined count has been reached by said counter after it has been set.

2. The apparatus of claim 1 wherein said wheel is provided with a magnet at a point proximate its circumference and wherein said sensor means includes a magnetic switching means mounted in close proximity to said wheel, such that as said wheel turns and said magnet passes said sensor means, a pulse is generated to increment said counting means.

3. The apparatus of claim 2 wherein said activated means includes an electrically driven actuator responsive to an output signal generated by said counting means and operative to cause said locking member to be moved from said unlocked position to said locked position.

4. Apparatus as recited in claim 3 wherein said electrically driven actuator includes a mechanical linkage and a bi-directional motor coupled to said locking member by said mechanical linkage.

5. Apparatus as recited in claim 4 wherein said mechanical linkage includes a pivotable lever for moving said locking member and including a lead screw and follower for applying an actuating force to said pivotable lever.

6. Apparatus as recited in claim 2 and further comprising signal-generating means disposed at said predetermined reference point for generating said first and second magnetic fields at different frequencies $F_1$ and $F_2$.

7. Apparatus as recited in claim 6 wherein said signal generating means includes means for sweeping the frequencies of said first and second magnetic fields over preselected ranges of frequencies.

8. The apparatus of claim 1 wherein said activated means includes an electrically driven actuator responsive to an output signal generated by said counting means and operative to cause said locking member to be moved from said unlocked position to said locked position.

9. Apparatus as recited in claim 8 wherein said electrically driven actuator includes a mechanical linkage and a bi-directional motor coupled to said locking member by said mechanical linkage.

10. Apparatus as recited in claim 9 wherein said mechanical linkage includes a pivotable lever for moving said locking member and including a lead screw and follower for applying an actuating force to said pivotable lever.

11. Apparatus as recited in claim 1 wherein said wheel includes a brake plate having at least one aperture formed therein for receiving said locking member.

12. Apparatus as recited in claim 11 wherein said counting means is a binary counter and said activated means includes a programmable AND gate.

13. Apparatus as recited in claim 12 and wherein said activated means further includes logic means responsive to the output of said AND gate and operative to actuate said rotation inhibiting means.

14. Apparatus as recited in claim 1 wherein said counting means is a binary counter and said activated means includes a programmable AND gate.

15. Apparatus as recited in claim 14 and wherein said activated means further includes logic means responsive to the output of said AND gate and operative to actuate said rotation inhibiting means.

16. An anti-theft apparatus for inhibiting the unauthorized use and removal of a shopping cart from a designated use area, comprising:

a wheel;

a rotation-inhibiting means in association with said wheel, said rotation-inhibiting means including a rigid locking member movable between an unlocked position and a locked position in which it immobilizes said wheel against movement;

a counting means;

means for detecting passages of said shopping cart past a predetermined reference point and operative to set and reset said counting means;

signal-generating means disposed at said predetermined reference point for generating first and second magnetic fields at different frequencies $F_1$ and $F_2$, said magnetic fields being detected by said means for detecting;

a sensor means for sensing rotation of said wheel and for generating an output which can be counted by said counting means; and a means activated by said counting means and operative to actuate said rotation-inhibiting means after a predetermined count has been reached by said counter after it has been set.

17. Apparatus as recited in claim 16 wherein said signal generating means includes means for sweeping the frequencies of said first and second magnetic fields over preselected ranges of frequencies.

* * * * *